(12) United States Patent
Arunachalam et al.

(10) Patent No.: US 12,192,806 B2
(45) Date of Patent: Jan. 7, 2025

(54) PREDICTIVE MODELING OF ENERGY CONSUMPTION IN A CELLULAR NETWORK

(71) Applicant: VERIZON PATENT AND LICENSING INC., Basking Ridge, NJ (US)

(72) Inventors: Harish Arunachalam, Frisco, TX (US); Neil Singh Sethi, Jersey City, NJ (US); Martin Konkel, Madison, NJ (US); Robert Belson, New York, NY (US); Patrick Wagstrom, Coventry, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 513 days.

(21) Appl. No.: 17/531,847

(22) Filed: Nov. 22, 2021

(65) Prior Publication Data

US 2023/0164599 A1 May 25, 2023

(51) Int. Cl.
*H04W 24/08* (2009.01)
*H04W 84/04* (2009.01)

(52) U.S. Cl.
CPC .......... *H04W 24/08* (2013.01); *H04W 84/042* (2013.01)

(58) Field of Classification Search
None
See application file for complete search history.

(56) References Cited

U.S. PATENT DOCUMENTS

| | | | | |
|---|---|---|---|---|
| 11,012,340 | B2* | 5/2021 | Ryan | H04L 41/142 |
| 2012/0259583 | A1* | 10/2012 | Noboa | H02J 13/00002 |
| | | | | 702/179 |
| 2018/0025041 | A1* | 1/2018 | Gray | G06F 16/23 |
| | | | | 707/803 |
| 2018/0070362 | A1* | 3/2018 | Ryan | H04L 43/065 |
| 2018/0330250 | A1* | 11/2018 | Nakayama | G06Q 10/0635 |
| 2022/0374810 | A1* | 11/2022 | Mandal | G06Q 10/06393 |
| 2024/0040501 | A1* | 2/2024 | Yuan | H04W 52/0206 |

* cited by examiner

*Primary Examiner* — Kodzovi Acolatse

(57) ABSTRACT

A predictive modeling approach to managing cellular network infrastructure is disclosed. In an embodiment, a method can include receiving raw data from a plurality of data sources populated while operating a cellular network. The method can then generate per-logical cell site data by normalizing the raw data based on a set of LCSs in the cellular network to generate per-LCS data. The method can then generate an example from the per-LCS data and generate a predicted energy consumption value for the given LCS by inputting the example into a predictive model (e.g., a decision tree-based model, such as an XGBoost model). From this output, the method can determine if the predicted energy consumption value is higher than an expected energy consumption value (e.g., a historical range of consumption). If so, the method can then label the given LCS as an outlier.

20 Claims, 6 Drawing Sheets

PREDICTIVE MODELING OF ENERGY CONSUMPTION IN A CELLULAR NETWORK

BACKGROUND INFORMATION

A cellular network includes a large number of devices that consume energy. Given this large number, identifying locations that are consuming anomalous amounts of energy is often difficult or impossible. Likewise, identifying the root causes of excessive energy consumption is often difficult or impossible, given the complex deployment of a cellular network.

DETAILED DESCRIPTION OF EXAMPLE EMBODIMENTS

Figure 1:
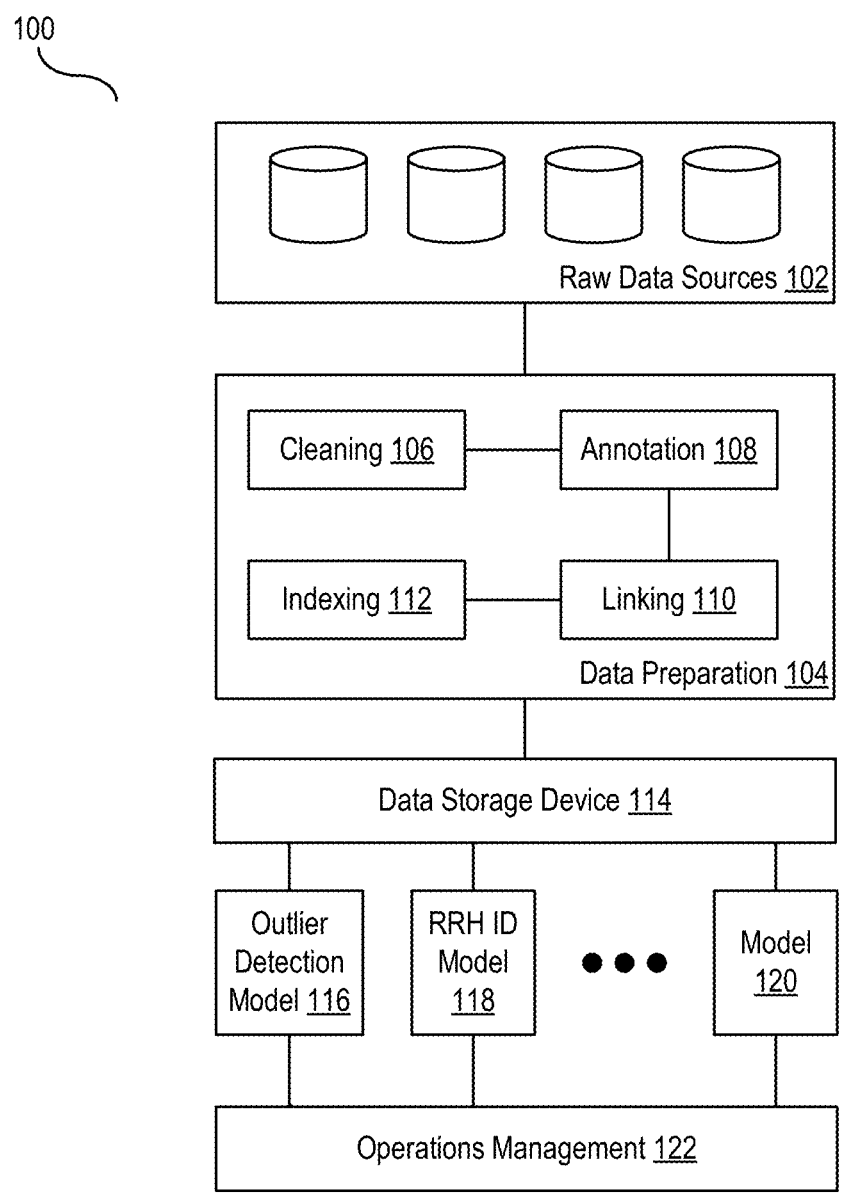
FIG. 1 is a block diagram of a system for managing the energy consumption of a cellular network according to some example embodiments.

The overall energy consumption of a cellular network is growing as 5G deployments encompass and expand existing 4G and 3G networks. Most cellular networks collect various types of data from their deployed network, including equipment information, network traffic, and electricity consumption. The example embodiments use this collected data to model energy consumption at logical cell site (LCS) locations across a cellular network. The example embodiments further provide root-cause analysis models on top of anomaly detection to record consumption deviations and dispatch field operations for site maintenance or remediation.

In an embodiment, a method can include receiving raw data from a plurality of data sources populated while operating a cellular network. The method can then generate per-logical cell site data by normalizing the raw data based on a set of logical cell sites in the cellular network to generate per-logical cell site data. The method can then generate an example from the per-logical cell site data and generate a predicted energy consumption value for the given logical cell site by inputting the example into a predictive model (e.g., an XGBoost model). From this output, the method can determine if the predicted energy consumption value is higher than an expected energy consumption value (e.g., a historical range of consumption). If so, the method can then label the given logical cell site as an outlier.

In an embodiment, receiving raw data can include receiving data comprising one or more of network consumption data, network equipment data, non-network equipment data, and external data. The network consumption data can include one or more of cellular traffic volume, number of active connections, total number of carriers, and coverage radius of a given logical cell site. The external data can include one or more of a location, temperature, precipitation, wind, gust, heating degree days, cooling degree days, and the nearest weather station of a given logical cell site. The network equipment data can include data related to one or more of radios, antennas, and baseband units of a given logical cell site. The non-network equipment data can include data related to one or more of heating, ventilation, and air conditioning (HVAC) units and batteries in a given logical cell site.

In an embodiment, the method can include normalizing the raw data based on a set of logical cell sites in the cellular network to generate per-logical cell site data comprises aggregating raw data associated with finer granularity to a given logical cell site based on a mapping of finer-grained equipment to the given logical cell site.

In an embodiment, the method can further include retrieving a transmission loss for the given logical cell site, adding the transmission loss to the example to generate an augmented example, and predicting a likelihood that the given logical cell site includes an in-shelter remote radio head by inserting the augmented example into a second predictive model. In some embodiments, inserting the augmented example into a second predictive model can include inserting the augmented example into an ensemble model, the ensemble model including a sequential combination of machine learning models selected from the group consisting of a gradient boosting model, support vector machine model, neural network model, adaptive boosting, and logistic regression model.

In the various embodiments, devices, systems, and computer-readable media as disclosed for performing the methods described above and, in more detail, herein.

FIG. 1 is a block diagram of a system 100 for managing the energy consumption of a cellular network according to some example embodiments.

In an embodiment, system 100 includes a plurality of raw data sources 102. The raw data sources 102 can comprise a grid-based storage layer that receives collected measurements of data points from various components of a cellular network. Examples of raw data include network consumption data, network equipment data, non-network equipment data, and external data. Further detail on raw data is provided in the descriptions below and is not repeated herein. In some embodiments, raw data sources 102 can further both internal and external data sources (e.g., data sources that can be queried via a remote application programming interface).

A data preparation processor 104 can access the raw data sources 102 and can prepare data stored in the raw data sources 102 for further processing. The data preparation processor 104 can include a cleaning stage 106, annotation stage 108, linking stage 110, and indexing stage 112.

During cleaning stage 106, data from raw data sources 102 is cleaned to remove invalid or outlying data. As one example, cleaning stage 106 can remove clearly erroneous data points (e.g., extreme temperatures) or anomalous data points (e.g., bursts or spikes in network traffic). In some embodiments, cleaning stage 106 can also include normalizing data formats to a common form. For example, all temperatures can be converted to Fahrenheit, or all network consumptions measures can be represented in bytes per second. In general, cleaning stage 106 comprises a formatting stage. Since no requirements are placed on raw data sources 102, and indeed some sources may be external, cleaning stage 106 operates to normalize data at the representational level so that downstream processing can be simplified.

In annotation stage 108, the cleaned data can be annotated with additional data. In some embodiments, annotation stage 108 can combine various data points to generate annotated data. For example, network consumption data includes data such as cellular traffic volume, number of active connections, total number of carriers, and coverage radius of a given LCS. In some embodiments, these data points can be stored and received individually. Thus, in some embodiments, annotation stage 108 can combine these data points into a single feature vector. Alternatively, or in conjunction with the foregoing, annotation stage 108 can process an individual data point and represent the data point in different manners. For example, a date data point can be annotated with a "day of the week" field. The specifics of annotation are not limiting and may be performed in various manners based on the underlying needs of the various models. Annotating can further comprise an aggregation of time by a larger time division. For example, each data point can be associated with a given month of the year and then grouped for later processing.

In linking stage 110, cleaned and annotated data is linked. In some embodiments, linking refers to mapping data points to the same underlying equipment. For example, a given piece of network equipment can generate data points that are stored in disparate storage areas of raw data sources 102. Thus, in linking stage 110, data points across data sets are linked based on their source to generate a per-source feature vector. As will be discussed, this per-source data can be further linked to a given LCS.

During indexing stage 112, data is mapped to a given logical cell site (LCS). As used herein, an LCS refers to a group of physical entities with which there is an energy cost or consumption amount associated. In some embodiments, an LCS can be defined as an entity that is charged for energy usage. As one example, an LCS can comprise a network cell site (e.g., an antenna and radio hut) that is billed directly for energy consumption. However, an LCS is not limited to a single, physical entity. For example, an LCS can comprise some or all components of a Cloud Radio Access Network (C-RAN) that are grouped together for energy consumption and billing purposes. Other types of LCSs can include network cell sites (e.g., eNodeB or gNodeB locations), indoor or outdoor small-cell nodes (e.g., picocells or femtocells), C-RAN hubs, mobile cell sites, network small-cell sites (e.g., aggregates of small-cell nodes), distributed antenna systems, etc.

In general, there are various levels of granularity of cellular equipment. At the lowest level, a single antenna or a single baseband unit consumes electricity. These lowest-level components are aggregated to form next-level components (e.g., a physical cell site that includes multiple antennas, radios, baseband units). These next-level components can further be aggregated into higher-level components (e.g., a C-RAN). Ultimately, all components can be aggregated to form a top-level component: the entire cellular network. An LCS can be situated at various levels of this hierarchy based on a cellular provider's energy consumption management and billing strategy.

In an embodiment, indexing stage 112 analyzes each cleaned, annotated, and linked feature and assigns it to a given LCS. In some embodiments, data may already be indexed to an LCS (e.g., network utilization data may be linked at the LCS level). However, other features may not. For example, network equipment data may be mapped to a lower level (e.g., a radio or antenna feature). As such, indexing stage 112 can query or maintain a mapping of lower-level features to LCSs. For example, a given item of lower-level equipment (e.g., antenna, radio, HVAC unit, battery, etc.) can be mapped to a given LCS (e.g., network cell site or C-RAN). In some embodiments, each item of lower-level equipment can be mapped to multiple LCSs (e.g., to a network cell site which, in turn, is mapped to a C-RAN).

In some embodiments, indexing stage 112 can output the cleaned, annotated, linked, and indexed data to a data storage device 114 that can maintain a canonical copy of the processed data. This data storage device 114 can then be queried ad hoc by models to perform training on various models and to provide up-to-date data for prediction. In some embodiments, data preparation processor 104 can execute on a periodic basis (e.g., monthly). In such an embodiment, a training set of data can be retrieved and used to train a model. Then, a hold-out set of data (e.g., the current month) can be queried to use for prediction, as discussed next). In brief, data preparation processor 104 can generate a set of pristine features to be used for model training and prediction. As illustrated, various models can access and utilize the data generated by data preparation processor 104, and thus the processing time and power required for such preparation can be removed from the per-model requirements, improving overall speed.

In an embodiment, various models are depicted, including outlier detection model 116, RRH identification model 118, and further models such as model 120. While only outlier detection model 116 and RRH identification model 118 are described in detail, other models (e.g., model 120) can be deployed. For example, other models can include data architecture planning, data management, data governance, proof of concept transitioning, network savings playbook generation, etc. As next discussed, the models can extract data from data storage device 114 and train application-specific models. Further, the models can extract data to use for prediction using the application-specific models. Outlier detection model 116 and RRH identification model 118 represent two such application-specific models.

In the illustrated embodiment, an outlier detection model 116 is depicted. In an embodiment, the outlier detection model 116 can train a predictive model that predicts the energy cost or consumption of a given LCS for a given forecasting period (e.g., the current month). As such, outlier detection model 116 can retrieve data from data storage device 114 and other sources (e.g., historical energy consumption amounts and/or costs) and build a training set. Outlier detection model 116 can then train the predictive model (e.g., XGBoost ensemble) and use the predictive model to predict monthly energy costs or consumptions for the most recent data stored in data storage device 114. Details of this operation are provided in more detail in the descriptions of FIGS. 2, 4A, and 4B and are not repeated herein.

In the illustrated embodiment, an RRH identification model 118 is depicted. In an embodiment, the RRH identification model 118 can train a predictive model that predicts whether a given LCS includes an in-shelter RRH. In some embodiments, the predictive model can also predict the distance from an RRH to a thermostat or other sensor. As used here, an RRH refers to radio frequency (RF) circuitry of a base station. The RRH can perform all RF functionality such as transmit and receive functions, filtering, and amplification. It also can include analog-to-digital or digital-to-analog converters and up/down converters. An RRH can also provide advanced monitoring and control features that allow operators to optimize performance from a remote, centralized location. An in-shelter RRH refers to an RRH that is installed within a confined housing of a base station. For example, a base station may include a tower and small enclosure storing equipment for operating the base station. When this enclosure houses the RRH, the RRH is referred to as an in-shelter RRH.

In brief, an RRH comprises a wireless radio transceiver communicatively coupled to an antenna (usually at a distance) via a wired connection such as a copper or fiber-optic line. When an RRH is in-shelter (i.e., physically located with temperature sensors and other cellular equipment in a confined space), these RRH units can significantly increase the heat of the location and thus result in extraneous cooling as well as power consumption. For example, a given in-shelter RRH can radiate around 224° F. of heat, which can cause a shelter thermostat to run an HVAC continuously. Further, when such RRH devices are closer to thermostats, the increase in HVAC energy consumption is correspondingly increased. In addition to HVAC usage, in-shelter RRHs also increase the maintenance costs of HVAC units (due to more frequent operation), increase the overall shelter temperature (including the ambient temperature of other devices), increase transmission line losses due to higher temperatures, and occupy space which could be utilized for other in-shelter equipment. Frequently, RRH devices are installed within shelters for a variety of reasons, including speed of deployment, capital constraints, antenna tower weight and space constraints, lack of access to leased property, and general engineering assurances or approvals. As a result, RRHs are frequently installed within a shelter or other enclosure. In general, moving an RRH outside of a confined space will reduce the cooling needed for a shelter and result in significant reductions in energy consumption and costs.

To remedy such issues, RRH identification model 118 can retrieve data from data storage device 114 and other sources (e.g., manual labels of RRH presence and distances to thermostats and other sensors) and build a training set. The RRH identification model 118 can then train the predictive model (e.g., an ensemble model) and use the predictive model to predict whether a given LCS includes one or more RRHs and, in some embodiments, the distance of some or all of those RRHs to a thermostat. Details of this operation are provided in more detail in the descriptions of FIGS. 3, 5A, and 5B and are not repeated herein.

In an embodiment, the outputs of the models (e.g., outlier detection model 116, RRH identification model 118, through model 120) can be retrieved from operations management 122. In an embodiment, operations management 122 can comprise any computing system that can utilize the outputs of the models. In some embodiments, operations management 122 can comprise an automated system. For example, operations management 122 can retrieve predicted energy consumptions from outlier detection model 116 and compare the predicted energy consumption to the actual energy consumption for the same period (e.g., the current month). In some embodiments, this comparison can be made directly in outlier detection model 116. As such, operations management 122 can identify a set of LCSs that are outliers relative to the recorded energy consumption. In some embodiments, operations management 122 can perform automatic adjustments to an outlier LCS (e.g., reduce throughput to lessen traffic volume). In an embodiment, operations management 122 can forward information to technicians or other personnel who can then triage LCS inspections to remedy potential problems causing increased energy consumption. Similarly, operations management 122 can retrieve a list of potential LCSs that include in-shelter LCS and schedule inspections of these LCSs.

Figure 2:
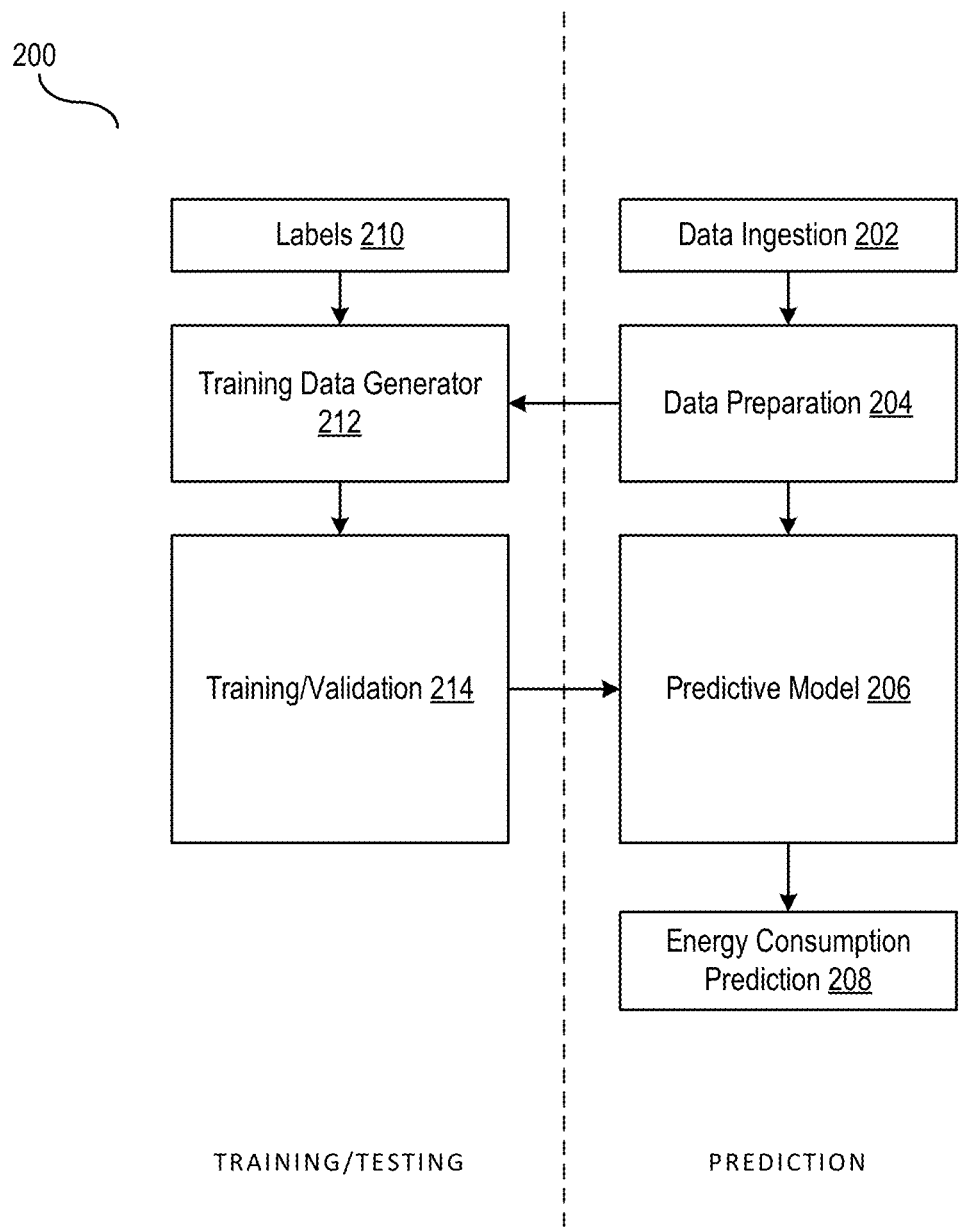
FIG. 2 is a block diagram of a system for detecting outlier logical cell sites based on predicted energy consumption according to some example embodiments.

FIG. 2 is a block diagram of a system 200 for detecting outlier logical cell sites based on predicted energy consumption according to some example embodiments.

During a training phase, a training data generator 212 can receive unlabeled data from data preparation stage 204 and labels 210. The data preparation stage 204 receives raw data via data ingestion feed 202, cleans, annotates, links, and indexes raw data to LCSs. Details of the operation of data ingestion feed 202 and data preparation stage 204 are provided, for example, in step 402A and step 402B of FIG. 4A and are not repeated herein. In brief, data preparation stage 204 generates a set of vectors representing a given LCS based on the processed raw data, which includes one or more of network consumption data, network equipment data, non-network equipment data, and external data.

During the training of the model, data preparation stage 204 can process a large corpus. In some embodiments, this large corpus can comprise raw historical data during a preconfigured time period. For example, data preparation stage 204 can generate monthly vectors for a given LCS over a preconfigured historical time period (e.g., one year). Data preparation stage 204 can use larger historical time periods (e.g., last two, three, or four years), and the specific duration is not limiting. In some embodiments, data preparation stage 204 can exclude the most recent month of data when providing data to training data generator 212. Specifically, the most recent month (e.g., current month) of data can be reserved for prediction, as will be discussed.

The training data generator 212 receives the unlabeled features from data preparation stage 204 and applies labels to each vector. In some embodiments, the labels comprise actual energy consumption (in, for example, KW/h) or costs (in, for example, dollars or cents) received from a provider of electricity (e.g., utility company). For example, the labels can be extracted from billing statements associated with each LCS. Since a given LCS comprises a billable entity, each LCS may have an associated billing statement for periods represented in the unlabeled features.

In some embodiments, training data generator 212 can execute periodically to re-train a model. For example, training data generator 212 can run monthly after a new energy consumption or cost label is received (e.g., via a billing statement). In some embodiments, training data generator 212 can augment a training dataset each month, thus increasing the total training data size. In other embodiments, training data generator 212 can use a sliding window approach to update the training data set with new data while removing stale data.

During a training and validation stage 214, a model is trained using the training data created by training data generator 212. In some embodiments, the model can comprise a discriminative model. In some embodiments, the model can comprise a decision tree-based model such as a random forest or gradient-boosted decision tree (e.g., XGBoost).

In some embodiments, the training and validation stage 214 can run a custom-built loop on top of the selected model to ensure that the model is not confused by the dimensionality of the training data. Further, the custom-built loop can balance the complexity of the model with the accuracy of the predictions.

In some embodiments, the training and validation stage 214 can include using an off-the-shelf model (e.g., XGBoost) to obtain a baseline prediction accuracy using all features of the training data. Then, the training and validation stage 214 can include selectively removing features from the training data and re-computing the penalty for removing the features. In some embodiments, a root mean squared error (RMSE) or average RMSE measurement is used to determine the penalty. In some embodiments, the training and validation stage 214 can randomly remove features. In other embodiments, the training and validation stage 214 can systematically select features to remove (e.g., by measuring the variability of the features among all examples to determine which features are more volatile than others, selecting the less volatile features first). The training and validation stage 214 can continuously re-execute this feature removal process while the accuracy of the model is within a confidence interval. Thus, the training and validation stage 214 can iteratively reduce the dimensionality of the training data set while the accuracy prediction is within the confidence interval. If the removal of a feature causes the accuracy to fall outside this confidence interval, the training and validation stage 214 can retain the feature and continue to remove other features in a similar manner. In some embodiments, the training and validation stage 214 can remove features to minimize the error rate and thus provide a better prediction accuracy. As a result, the training and validation stage 214 can reduce the dimensionality of the training data to include only the most impactful features. In addition to feature reduction, the training and validation stage 214 can also iteratively train the model to adjust hyperparameters until an accuracy meets the desired confidence interval. Examples of such hyperparameters in an XGBoost model include the maximum number of decision trees, learning rate, etc.

After training, the model parameters and hyperparameters can be persisted to a data storage device (not illustrated) for use during prediction. During a prediction phase, the predictive model 206 can be loaded from the data storage device and used to predict energy consumption for one or more LCSs. During prediction, the data preparation stage 204 can generate feature vectors for each LCS during the prediction window (e.g., the most recent month) and can feed these unlabeled vectors into the predictive model 206 to generate a predicted energy consumption value 208. In some embodiments, the energy consumption value can comprise an energy consumption amount (in KW/h) and/or an energy cost (in dollars or cents). As discussed in FIG. 1, this predicted value for an LCS can then be compared to the actual energy consumption/cost and used to flag outlier LCSs.

Figure 3:
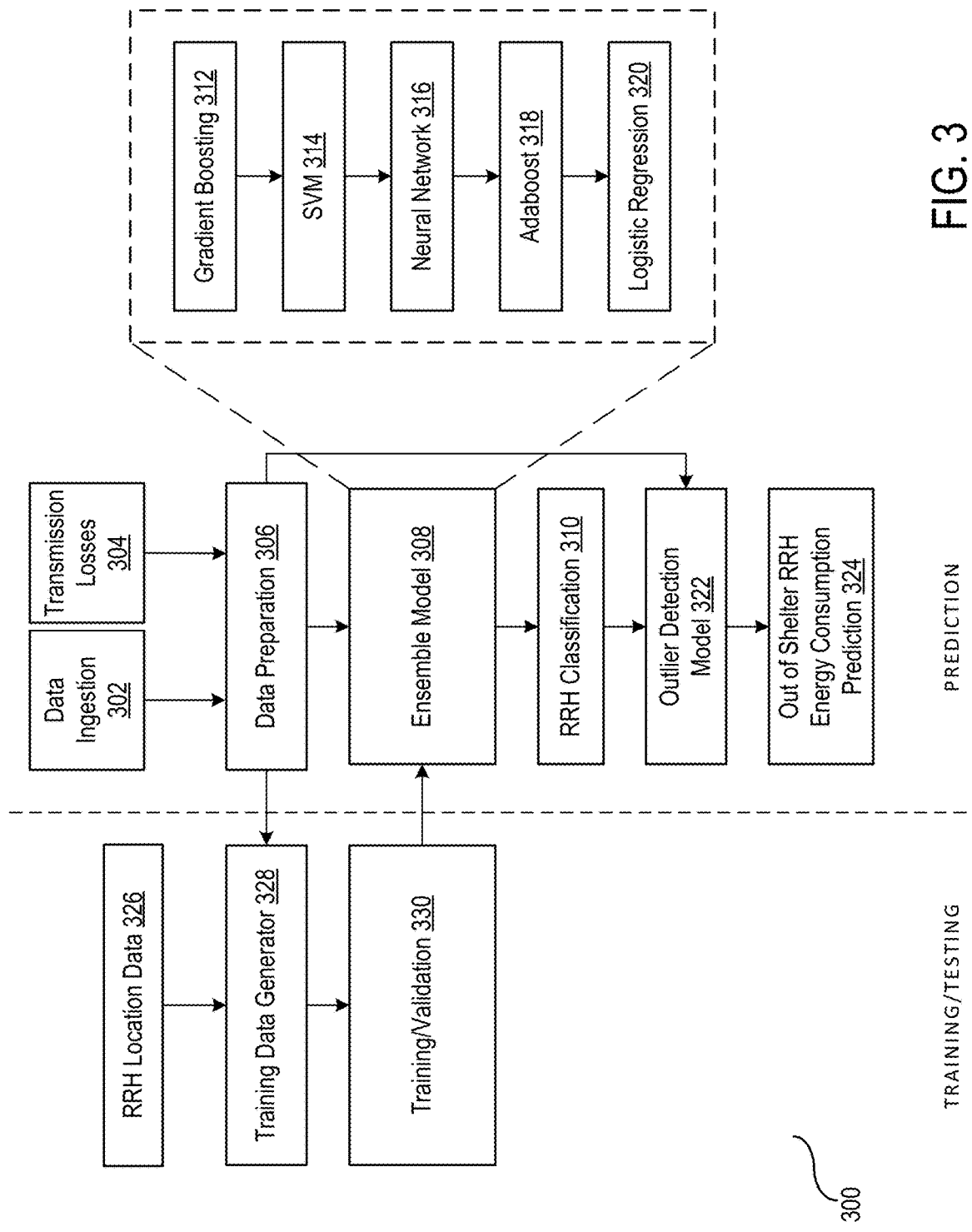
FIG. 3 is a flow diagram illustrating a system for predicting the likelihood of an in-shelter remote radio head according to some example embodiments.

FIG. 3 is a flow diagram illustrating a system 300 for predicting the likelihood of an in-shelter remote radio head according to some example embodiments.

During a training phase, a training data generator 328 can receive unlabeled data from data preparation stage 306 and RRH location data 326. The data preparation stage 306 receives raw data via data ingestion feed 302, cleans, annotates, links, and indexes raw data to LCSs. Details of the operation of data ingestion feed 302 and data preparation stage 306 are provided, for example, in step 402A and 402B of FIG. 4A and are not repeated herein. In brief, data preparation stage 306 generates a set of vectors representing a given LCS based on the processed raw data, which includes one or more of network consumption data, network equipment data, non-network equipment data, and external data. In the illustrated embodiment, the data preparation stage 306 can additionally augment the LCS vectors described previously with transmission loss data 304.

In various configurations, RRHs can be located in various positions in a cell site. In some deployments, an RRH can be installed on an outdoor antenna mast or outside a radio hut. In other deployments, an RRH can be installed inside a hut for various reasons discussed above. An antenna is connected to the RRH via a physical connection (e.g., copper coaxial). Thus, an antenna is physically separated from the RRH by a specific distance, the distance corresponding to the length of the physical connection medium (e.g., copper). Since this is a physical connection, some transmission loss occurs on the line. As a transmission line increases in length, the transmission loss can increase. Thus, transmission losses between antenna and RRH can be a strong indicator of the position of the RRH. For example, a very small transmission loss can indicate an RRH is close to the antenna and thus likely outside. By contrast, a very large transmission loss can indicate that an RRH is further separated in space from the antenna, potentially indicating an in-shelter RRH. While extremely small and large transmission losses are strong indicators of RRH position, the majority of transmission losses may likely fall within a medium-range distance where the exact position of the RRH is difficult to ascertain from transmission losses alone. For example, the distance between an in-shelter RRH and an outdoor location may only be a few feet. For this reason, system 300 combines the transmission line loss with the various other features discussed herein (e.g., network consumption data, network equipment data, non-network equipment data, and external data) to train a predictive model. In some embodiments, the transmission line loss can be measured and reported by the RRH itself or may be measured by another device or manually by an operator. As such, the transmission loss can be mapped to a specific item of network equipment and, ultimately, to an LCS as described with other data points. In some embodiments, if multiple RRHs exist within a given LCS, an aggregate of the transmission losses can be calculated (e.g., an average transmission loss). In some embodiments, the transmission loss can be represented in decibels. Alternatively, or in conjunction with the foregoing, the transmission loss can be represented as a distance computed based on the measured transmission loss.

During the training of the model, data preparation stage 306 can process a large corpus of data. In some embodiments, this large corpus can comprise raw historical data during a preconfigured time period. For example, data preparation stage 306 can generate monthly vectors (including transmission losses) for a given LCS over a preconfigured historical time period (e.g., one year). Data preparation stage 306 can use larger historical time periods (e.g., last two, three, or four years), and the specific duration is not limiting. In some embodiments, data preparation stage 306 can exclude the most recent month of data when providing data to training data generator 328. Specifically, the most recent month (e.g., current month) of data can be reserved for prediction, as will be discussed.

The training data generator 328 receives the unlabeled features from data preparation stage 306 and applies labels to each vector. In some embodiments, the RRH location data 326 can be used as labels for each LCS vector. In some embodiments, the RRH location data 326 can be generated by manually inspecting LCSs to determine whether the LCS includes an in-shelter RRH. In some embodiments, the RRH location data 326 can comprise a classification (e.g., in-shelter, outside-shelter, on-antenna). In other embodiments, the RRH location data 326 can comprise a binary classification (e.g., in-shelter, not in-shelter). In some embodiments, the number of LCSs associated with RRH location data 326 may be less than all LCSs. In such a scenario, training data generator 328 may only use LCS vectors associated with RRH location data 326 for training and discard any LCS vectors not associated with 326.

In some embodiments, training data generator 328 can execute periodically to re-train a model. For example, training data generator 328 can run monthly after new LCSs are labeled via inspection. In some embodiments, training data generator 328 can augment a training dataset each month (or other time increment), thus increasing the total training data size. In other embodiments, training data generator 328 can use a sliding window approach to update the training data set with new data while removing stale data (e.g., LCS locations previously labeled as in-shelter, but remedied place RRH devices outside a shelter).

During a training and validation stage 330, a model is trained using the training data created by training data generator 328. In some embodiments, the model can include an ensemble model comprising a plurality of base learner models. One example of an ensemble model is depicted in FIG. 3.

Specifically, as illustrated, one implementation of a stacked ensemble of heterogenous learners includes a gradient boosting model 312, support vector machine 314, neural network 316 (e.g., deep learning network), adaptive boosting (Adaboost) model 318, and a final meta learner such as a logistic regression model 320. The specific types of models are not intended to be limiting, and other models can be used in lieu of, or in addition to, the models described herein. During training and during prediction, each model in the ensemble receives all features generated by training data generator 328 (during training) or via data preparation stage 306 (during production). Further, the models sequentially receive (as another feature) the previous predictions from earlier models. Thus, gradient boosting model 312 receives only features from training data generator 328 or data preparation stage 306; support vector machine 314 receives features from training data generator 328 or data preparation stage 306 and the prediction of gradient boosting model 312; neural network 316 receives features from training data generator 328 or data preparation stage 306 and the predictions of gradient boosting model 312 and support vector machine 314; and so forth. Ultimately, a final meta learner (e.g., logistic regression model 320) receives features from training data generator 328 or data preparation stage 306 and all of the predictions from the models in the ensemble. The logistic regression model 320 then weights the outputs of the individual models to generate a final classification. The logistic regression model 320 can output a binary classification of the features (e.g., LCS) as having or not having an in-shelter LCS. In some embodiments, a linear regression model or similar model can be used as a meta-model if other types of data are predicted. For example, a linear regression model can be used to predict the distance of the RRH to the antenna. As another example, a random forest or decision tree model can be used to predict a non-binary classification.

In the illustrated embodiment, the models of the ensemble model 308 are illustrated sequentially. That is, each model (excluding the first) receives the prediction of a previous model and, in some embodiments, the original features (or a subset thereof). In some embodiments, the features used for each model can vary based on the type of model. The prediction of the final model or learner (e.g., Adaboost 318) is then fed to the final meta-model or ensembler (e.g., logistic regression model 320) along with, in some embodiments, some or all of the original features. The disclosure, however, should not be limited as such and other alternative configurations of ensembles can be implemented. For example, in an embodiment, each of the models (312, 314, 316, 318) can be trained on the original features independent of one another and the final meta-model (e.g., logistic regression model 320) can be used to generate a final prediction based on the predictions of the previous models (312, 314, 316, 318). As another example, each model (excluding the first model) can receive the original features and each prediction made by previous models. For example, support vector machine 314 can receive the prediction of gradient boosting model 312 and the original features, neural network 316 can receive the predictions of gradient boosting model 312 and support vector machine 314 as well as the original features, etc. In this embodiment, the meta-model (e.g., logistic regression model 320) can then receive all predictions of all learners or models as well as the original features (or subset thereof) to generate a final prediction.

During training, each model can be trained and validated separately to minimize the error of the individual models. In some embodiments, a k-folds cross-validation strategy can be used during training and testing of the models of the ensemble. Alternatively, a resampling with replacement strategy can be used for training and test. As described in FIG. 2, a feature removal loop can also be used to determine which features are most impactful.

After training, the ensemble model parameters and hyper-parameters can be persistently stored in a data storage device (not illustrated) for use during prediction. During a prediction phase, the ensemble model 308 can be loaded from the data storage device and used to predict in-shelter RRH classifications for one or more LCSs. During prediction, the data preparation stage 306 can generate feature vectors for each LCS during the prediction window (e.g., the most recent month) and can feed these unlabeled vectors into the ensemble model 308 to generate an RRH classification 310 (e.g., in-shelter or not in-shelter).

In some embodiments, this RRH classification 310 can be used to trigger a prediction of energy consumption or costs using the outlier detection model 322 described in FIG. 2. Details of outlier detection model 322 are provided in FIG. 2 and not repeated herein. Specifically, for all LCS vectors classified as having an in-shelter RRH, the original feature vector from data preparation stage 306 can be retrieved and updated to simulate the moving of an RRH outside a shelter. In some embodiments, this simulation can comprise reducing an average indoor temperature of the LCS vector or adjusting other parameters found to be influenced by the location of an RRH. The modified LCS vector can then be input into the outlier detection model 322 to generate an out-of-shelter RRH energy consumption prediction 324. In some embodiments, this out-of-shelter RRH energy consumption prediction 324 represents the expected energy consumption (or cost) for a given LCS if an RRH is moved outside of a confined space. Thus, system 300 can simulate the cost and energy savings of performing such an action without requiring the action to be undertaken.

Figure 4A:
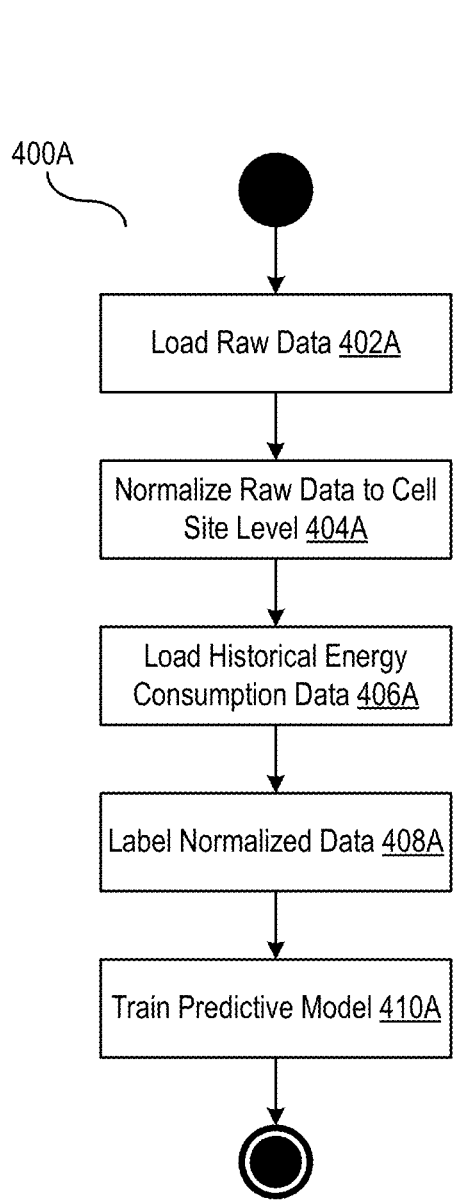
FIG. 4A is a flow diagram illustrating a method for training a predictive model used for predicting the energy consumption of a logical cell site according to some example embodiments.

FIG. 4A is a flow diagram illustrating a method for training a predictive model used for predicting the energy consumption of a logical cell site according to some example embodiments.

In step 402A, method 400A can include loading raw data and, in step 404A, method 400A can comprise normalizing raw data to the level of an LCS. The raw data, and ultimate LCS data, can include various data types and data points described herein. In some embodiments, step 402A and step 402B can be performed in a batch mode (as described in FIG. 1) and can be replaced with a step of retrieving the processed data from a database or processed data.

In the various embodiments, raw data can be classified as network consumption data, network equipment data, non-network equipment data, or external data. Other data classifications can be used, and the disclosure is not limited to only these types.

Network consumption data includes data such as cellular traffic volume, number of active connections, total number of carriers, and coverage radius of a given LCS.

Cellular traffic volume can refer to the amount (e.g., size) of data transferred for a given network element. A number of active connections can refer to a number of UEs connected via an air interface to a cellular radio. A total number of carriers can refer to the number of frequency bands used by a given radio (e.g., to support different types of 3G, 4G, 5G, etc., services and frequencies). A coverage radius can refer to a distance to the furthest UE connected to a given radio.

In some embodiments, raw network consumption data can be collected for each radio element in a cellular network element. For example, a base transceiver station, eNodeB, gNodeB, or similar network element can collect and report network consumption data to a repository of network consumption data. In some embodiments, a given LCS can include multiple radio elements. Thus, in some embodiments, method 400A can include aggregating multiple data points from multiple radios for a given LCS. In some embodiments, method 400A can utilize a mapping of radio elements (or similar elements) to LCSs to facilitate the mapping.

In some embodiments, method 400A can aggregate all data for a given LCS into a per-LCS feature. In some embodiments, method 400A can include computing a total data volume traffic, average number of active connections, average number of total carriers, and average coverage radius, for each month of a calendar year. Next, method 400A can include computing a quarterly aggregate data of traffic, active connections, average total carriers, and average coverage radius by grouping months into quarters.

External data includes data such as a location, temperature, precipitation, wind, gust, heating degree days, cooling degree days, and nearest weather station of a given LCS. In some embodiments, In an embodiment, for each LCS, method 400A can retrieve temperature, wind, gust, and similar data from a third-party service such as National Oceanic and Atmospheric Administration (NOAA) data feeds. In such an embodiment, method 400A can retrieve a location associated with an LCS (maintained in a mapping or other database) and use the location to query the third-party service for weather-related data. In some embodiments, method 400A can include periodically polling the third-party service to retrieve a time-series of weather data. In some embodiments, method 400A can poll the third-party service monthly. In some embodiments, method 400A can further identify the nearest weather station to an LCS by computing a haversine distance of latitudes and longitudes of the LCS and weather station.

In some embodiments, method 400A can further comprise generating aggregate features from the weather data. Examples of aggregate features include a total precipitation amount for a month, the number of heating degree days per month, and the number of cooling degree days per month. In an embodiment, heating degree days (HDD) are a measure of how cold the temperature was on a given day or during a period of days. A count of HDDs is an estimate of how many days in a given period (e.g., month) had temperatures under a threshold value (e.g., 65° F.), implying the need for indoor heating. In an embodiment, cooling degree days (CDD) are a measure of how hot the temperature was on a given day or during a period of days. A count of CDDs is an estimate of how many days in a given period (e.g., month) had temperatures over a threshold value (e.g., 65° F.), implying the need for indoor cooling.

Network equipment data includes data related to devices such as radios, antennas, and baseband units of a given LCS. A given LCS can include multiple such equipment, and thus, in some embodiments, method 400A aggregates data from network equipment for a given LCS and, in some embodiments, for a given time period (e.g., month). For example, a given LCS can include multiple eNodeB or gNodeB devices which, in turn, can each include multiple antennas, radios, and baseband units.

Examples of network equipment data include, without limitation, an aggregate frequency capability, transceiver and receiver capabilities (e.g., number of ports), maximum output power (wattage), transceiver and receiver enabled sum, radio power, band caps for various spectrums namely (e.g., 700, AWS B4, AWS/AWS3, 700/850, 850 B5, CBRS B48, 700 B13, 700/850 AWS, LAA, PCS B25 AWS B4, etc.).

Non-network equipment data includes data related to devices such as heating, ventilation, and air conditioning (HVAC) units and batteries in a given LCS. In an embodiment, a given LCS can be associated with one or more HVAC units and/or economizers and one or more batteries.

In some embodiments, data representing the HVAC units can include a size of the HVAC unit (e.g., a coverage size in square feet, furnace size in BTU, air conditioner size in BTU, etc.), a compressor material type (represented as an enumeration), a fuel type (represented as an enumeration), or similar characteristics of an HVAC system.

In some embodiments, an LCS can be associated with one or more lead-acid or nickel-cadmium batteries. In general, battery type affects energy consumption due to the cooling requirements of such batteries. For example, lead-acid batteries may require cooling to a maximum of 76-78° F., while nickel-cadmium batteries may require cooling to a maximum of approximately 80° F. Thus, in some embodiments, batteries can be represented as a type, amount, and a maximum cooling temperature. In some embodiments, each battery can also be associated with a chemical value depending on the type of battery. For instance, a lead-acid battery can be represented as a percent of lead-acid, and nickel-cadmium batteries can be represented as a chemical quantity of electrolyte. In some embodiments, the non-network equipment data can be associated with individual components, and thus, method 400A can aggregate non-network equipment data for a given LCS based on a mapping of non-network equipment to LCS. Similar to other data points, method 400A can average the reported values over a time period (e.g., month) to generate aggregate features.

As discussed in the various embodiments above, all of the raw data can be retrieved and normalized such that all data is mapped to a single LCS. Thus, each LCS vector comprises the union of all normalized features. Further, data can be discretized into months, providing twelve aggregate feature vectors per-LCS per year. Similarly, the data can be represented as twelve matrices for each month, each matrix including per-LCS feature vectors.

In step 406A, method 400A can include loading historical energy consumption or cost data. In some embodiments, the historical energy consumption or cost data can be received from a utility provider or other third party. In some embodiments, energy consumption can be represented as an amount of energy in KW/h, while energy costs can be measured in dollars or cents.

In step 408A, method 400A can include labeling the normalized data (e.g., LCS vectors) with the historical energy consumption or cost data. As described, historical energy consumption or cost data can be associated with a given time period (e.g., month). Further, historical energy consumption or cost data can be associated with a specific LCS (based on, for example, a billing address or code). Thus, in step 408A, method 400A can select each item of historical energy consumption or cost data and assign the item of historical energy consumption or cost data to a corresponding LCS vector based on an LCS identifier and a matching time period. This historical energy consumption or cost data can thus be used as the label to predict.

In step 410A, method 400A can train a predictive model using the labeled LCS vectors.

In some embodiments, the predictive model can comprise a discriminative model. In some embodiments, the model can comprise a decision tree-based model such as a random forest or gradient-boosted decision tree (e.g., XGBoost). In some embodiments, method 400A can run a custom-built loop on top of a predictive model to ensure that the model is not confused by the dimensionality of the training data. Further, the custom-built loop can balance the complexity of the model with the accuracy of the predictions.

In some embodiments, method 400A can use an off-the-shelf model (e.g., XGBoost) to obtain a baseline prediction accuracy using all features of the training data. Then, step 410A can include selectively removing features from the training data and re-computing the penalty for removing the features. In some embodiments, a root mean squared error (RMSE) or average RMSE measurement is used to determine the penalty. In some embodiments, method 400A can randomly remove features. In other embodiments, method 400A can systematically select features to remove (e.g., by measuring the variability of the features among all examples to determine which features are more volatile than others, selecting the less volatile features first). The method 400A can continuously re-execute this feature removal process while the accuracy of the model is within a confidence interval. Thus, method 400A can iteratively reduce the dimensionality of the training data set while the accuracy prediction is within the confidence interval. If the removal of a feature causes the accuracy to fall outside this confidence interval, method 400A can retain the feature and continue to remove other features in a similar manner. In some embodiments, method 400A can remove features to minimize the error rate and thus provide a better prediction accuracy. As a result, method 400A can reduce the dimensionality of the training data to include only the most impactful features. In addition to feature reduction, method 400A can also iteratively train the model to adjust hyperparameters until an accuracy meets the desired confidence interval. Examples of such hyperparameters in an XGBoost model include the maximum number of decision trees, learning rate, etc.

Figure 4B:
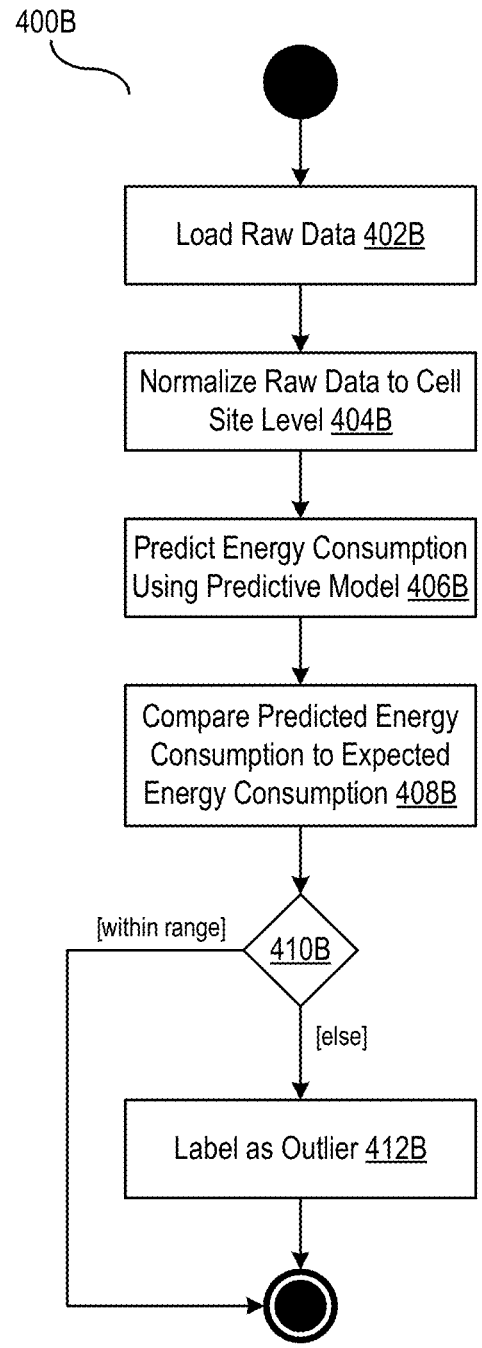
FIG. 4B is a flow diagram illustrating a method for predicting the energy consumption of a logical cell site according to some example embodiments.

After training, method 400A can persist the model parameters and hyperparameters to a data storage device for use during prediction. FIG. 4B describes further detail on using the trained model for prediction.

FIG. 4B is a flow diagram illustrating a method for predicting the energy consumption of a logical cell site according to some example embodiments.

In step 402B, method 400B can include loading raw data and, in step 404B, method 400B can comprise normalizing raw data to the level of an LCS. The raw data, and ultimate LCS data, can include various data types and data points described herein. Processing in step 402B and step 404B is similar to that of step 402A and step 404A of FIG. 4A, respectively, and those details (e.g., the types of data) are not repeated herein. In contrast, however, to step 402A and step 404A of FIG. 4A, step 402B and step 404B may only operate on a limited amount of data used for predicting. For example, step 402B and step 404B may only extract the most recent month of data to normalize for prediction. Thus, while the processing in step 402B and step 404B is similar to that of step 402A and step 404A, the processing may be scaled down to only a most recent subset of all data normalized. As discussed in connection with FIG. 1, step 402B and step 404B can be performed in a batch mode, and step 402B and step 404B can be replaced with a step of extracting the most recent period of data (e.g., most recent month) from a database of processed data.

In step 406B, method 400B can include predicting an energy consumption or cost value for a given LCS vector.

In some embodiments, method 400B can load the predictive model from the data storage device and use the predictive model to predict energy consumption for one or more LCSs. During prediction, method 400B can generate feature vectors for each LCS during the prediction window (e.g., the most recent month) and can feed these unlabeled vectors into the predictive model to generate a predicted energy consumption value. In some embodiments, the energy consumption value can comprise an energy consumption amount (in KW/h) and/or an energy cost (in dollars or cents).

In step 408B, method 400B can include comparing the predictive energy consumption (or cost) to known energy consumption (or cost). In this embodiment, method 400B can load a most recent energy consumption (or cost) from, for example, a billing statement issued by an energy provider for an LCS associated with the result predicted in step 406B. In some embodiments, since the LCS vector generated for prediction corresponds to a most recent period (e.g., the most recent month or billing statement cycle), method 400B can compare the output of the model (i.e., the prediction) to the known value (i.e., the billing statement value). In some embodiments, method 400B can compute a difference between the values.

In step 410B, method 400B can then determine if that difference exceeds a preconfigured interval or range. For example, method 400B can determine if the actual energy consumption (or cost) is within five percent of the actual energy consumption (or cost). If so, method 400B can ignore the LCS associated with the LCS vector and, implicitly, determine that the energy consumption (or cost) of the LCS is within a predicted range.

In step 412B, however, method 400B can label an LCS that's predicted energy consumption (or cost) is out of the preconfigured interval. In such a scenario, the predicted energy consumption (or cost) is significantly higher or lower than the actual energy consumption (or cost) and thus represents an anomaly. As discussed in FIG. 1, this labeling of LCSs as anomalies can be used for automated or manual site improvements to improve energy efficiency.

Figure 5A:
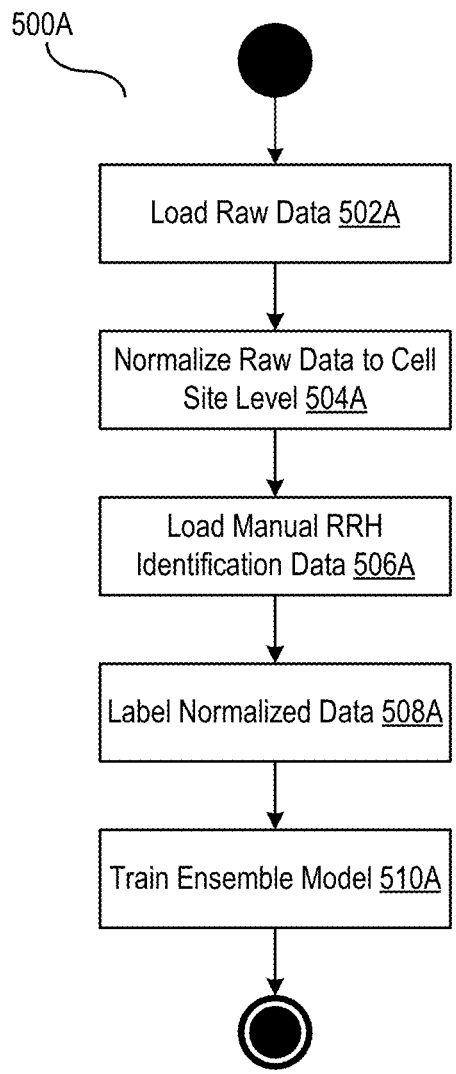
FIG. 5A is a flow diagram illustrating a method for training a predictive model used for predicting the installation of an in-shelter remote radio head in a logical cell site according to some example embodiments.

FIG. 5A is a flow diagram illustrating a method for training a predictive model used for predicting the installation of an in-shelter remote radio head in a logical cell site according to some example embodiments.

In step 502A, method 500A can include loading raw data and, in step 504A, method 500A can comprise normalizing raw data to the level of an LCS. The raw data, and ultimate LCS data, can include various data types and data points described herein. Details of step 502A and step 504A are substantially similar, if not identical, to that of step 402A and step 404A and are not repeated herein.

In step 506A, method 500A can load manual RRH identification data. As discussed in the description of RRH location data 326 of FIG. 3, this RRH identification data can comprise a classification of a given LCS location (and thus vector) as having or not having an RRH installed within a shelter. In other embodiments, the classification can be non-binary and comprise an enumeration of different types of RRH placements.

In step 508A, method 500A can include labeling the normalized data (e.g., LCS vectors) with the manual RRH location classification labels. Method 500A can select each RRH identification label and assign the RRH identification label to a corresponding LCS vector based on an LCS identifier.

Figure 5B:
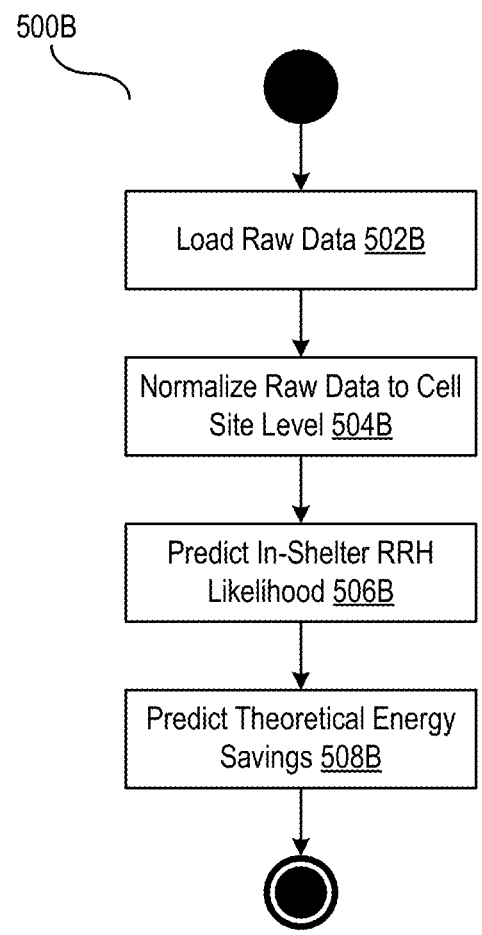
FIG. 5B is a flow diagram illustrating a method for predicting the installation of an in-shelter remote radio head in a logical cell site according to some example embodiments.

In step 510A, method 500A can train an ensemble model using the labeled data. As described in FIG. 3, the ensemble model can comprise a sequential set of machine learning models that use all features and all previous predictions to classify a given LCS as including or not including an in-shelter RRH. During training, each model can be trained and validated separately to minimize the error of the individual models. In some embodiments, a k-folds cross-validation strategy can be used during training and testing of the models of the ensemble. Alternatively, a resampling with replacement strategy can be used for training and test. As described in FIG. 2, a feature removal loop can also be used to determine which features are most impactful. After training, method 500A can persist the ensemble model parameters and hyperparameters to a data storage device for use during prediction. FIG. 5B describes further detail on using the trained model for prediction.

FIG. 5B is a flow diagram illustrating a method for predicting the installation of an in-shelter remote radio head in a logical cell site according to some example embodiments.

In step 502B, method 500B can include loading raw data and, in step 504B, method 500B can comprise normalizing raw data to the level of an LCS. The raw data, and ultimate LCS data, can include various data types and data points described herein. Processing in step 502B and step 504B is similar to that of step 402A and step 404A of FIG. 4A and those details (e.g., the types of data) are not repeated herein. In contrast, however, to step 402A and step 404A of FIG. 4A, step 502B and step 504B may only operate on a limited amount of data used for predicting. For example, step 502B and step 504B may only extract the most recent month of data to normalize for prediction. Thus, while the processing in step 502B and step 504B is similar to that of step 502A and step 504A, the processing may be scaled down to only a most recent subset of all data normalized. As discussed in connection with FIG. 1, step 502B and step 504B can be performed in a batch mode, and step 502B and step 504B can be replaced with a step of extracting the most recent period of data (e.g., most recent month) from a database of processed data.

In step 506B, method 500B can include predicting an RRH classification using the ensemble method.

In some embodiments, method 500B can load the ensemble model from the data storage device and use the ensemble model to predict an RRH classification (e.g., in-shelter or not in-shelter) for one or more LCSs. During prediction, method 500B can generate feature vectors for each LCS during the prediction window (e.g., the most recent month) and can feed these unlabeled vectors into the ensemble model to generate an RRH classification label. As discussed, the RRH classification label can comprise a binary classification or non-binary classification. Alternatively, or in conjunction with the foregoing, the ensemble model can predict an average distance between an antenna and an RRH.

In step 508B, method 500B can include predicting a theoretical energy consumption or cost for the LCS vector if the underlying LCS used an out-of-shelter RRH. Specifically, for all LCS vectors classified as having an in-shelter RRH, the original feature vector can be retrieved and updated to simulate the moving of an RRH outside a shelter. In some embodiments, this simulation can comprise reducing an average indoor temperature of the LCS vector or adjusting other parameters found to be influenced by the location of an RRH. The modified LCS vector can then be input into an outlier detection model (as described in FIGS. 2, 4A, and 4B) to generate an out-of-shelter RRH energy consumption prediction. In some embodiments, this out-of-shelter RRH energy consumption prediction represents the expected energy consumption (or cost) for a given LCS if an RRH is moved outside of a confined space. Thus, method 500B can simulate the cost and energy savings of performing such an action without requiring the action to be undertaken.

In some embodiments, method 500B can be executed after method 400B. That is, in some embodiments, method 400B can be used to predict whether a given LCS is an outlier. Then, the LCS vector classified as an outlier (e.g., via method 400B) can be input into the ensemble model in method 500B to determine if the LCS vector likely includes an in-shelter RRH. In some embodiments, method 500B can be swapped with other root cause models to enable rapid detection of known faults by first filtering LCSs that are outliers and then applying a second prediction based on known root causes.

The foregoing embodiments described in connection with FIGS. 5A and 5B describe analysis of in-shelter RRH data to predict the presence of an RRH within a base station shelter or enclosure. However, these embodiments can be equally applied to any type of equipment (e.g., any identified item of network equipment) within a base station shelter that generates heat or otherwise consumes electricity and thus affects the overall energy consumption and cost of a given base station.

Figure 6:
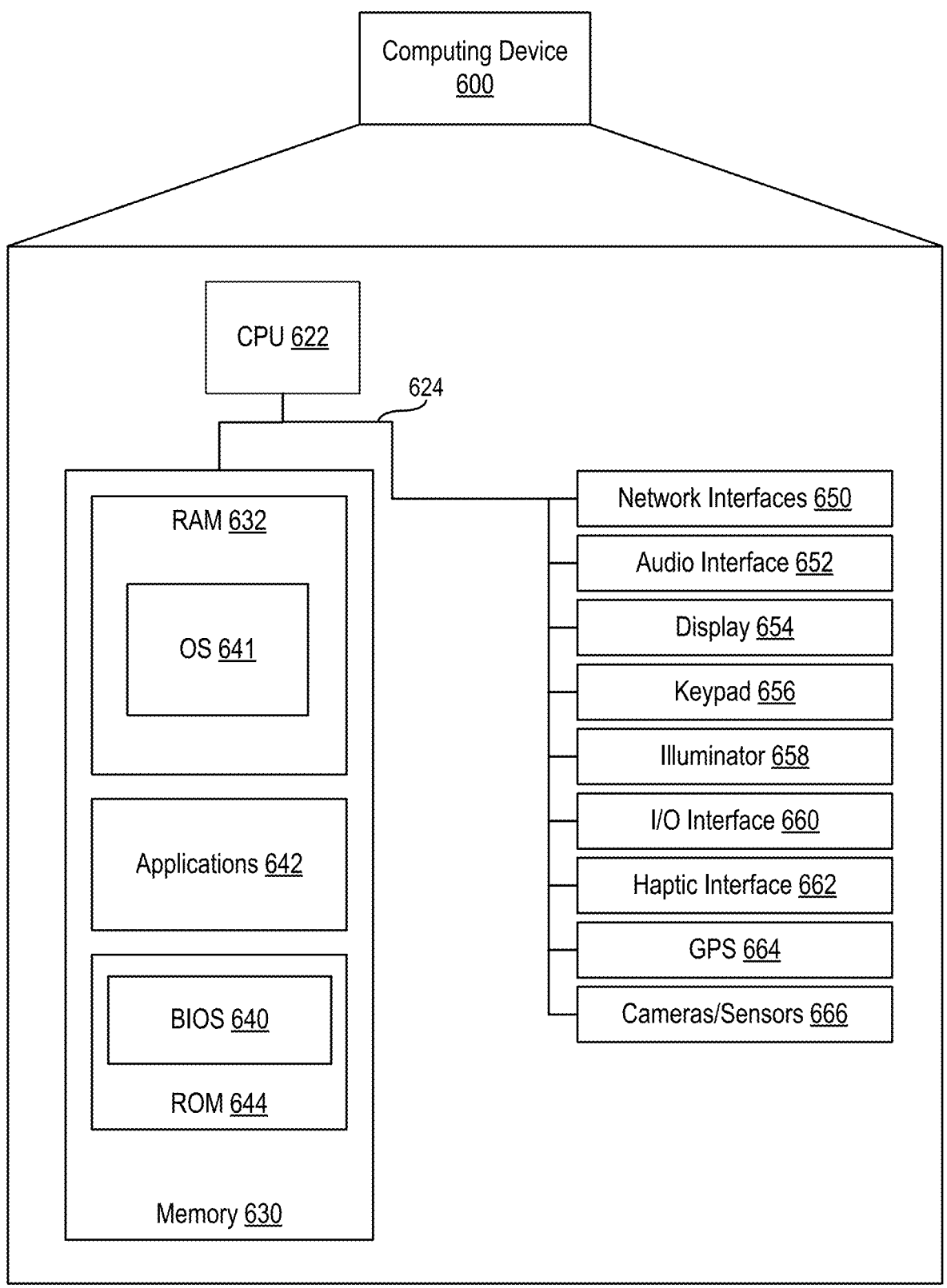
FIG. 6 is a block diagram illustrating a computing device showing an example of a client or server device used in the example embodiments.

FIG. 6 is a block diagram illustrating a computing device showing an example of a client or server device used in the various embodiments.

The computing device 600 may include more or fewer components than those shown in FIG. 6, depending on the deployment or usage of the computing device 600. For example, a server computing device, such as a rack-mounted server, may not include an audio interface 652, display 654, keypad 656, illuminator 658, haptic interface 662, Global Positioning System receiver 664, or sensors 666 (e.g., camera, temperature sensor, etc.). Some devices may include additional components not shown, such as graphics processing unit (GPU) devices, cryptographic coprocessors, artificial intelligence (AI) accelerators, or other peripheral devices.

As shown in the figure, the computing device 600 includes a central processing unit (CPU 622) in communication with a mass memory 630 via a bus 624. The computing device 600 also includes a network interface 650, an audio interface 652, a display 654, a keypad 656, an illuminator 658, an input/output interface 660, a haptic interface 662, a Global Positioning System receiver 664, and cameras or sensors 666 (e.g., optical, thermal, or electromagnetic sensors). Computing device 600 can include sensors 666. The positioning of the sensors 666 on the computing device 600 can change per computing device 600 models, per computing device 600 capabilities, and the like, or some combination thereof.

In some embodiments, the CPU 622 may comprise a general-purpose CPU. The CPU 622 may comprise a single-core or multiple-core CPU. The CPU 622 may comprise a system-on-a-chip (SoC) or a similar embedded system. In some embodiments, a GPU may be used in place of, or in combination with, a CPU 622. Mass memory 630 may comprise a dynamic random-access memory (DRAM) device, a static random-access memory device (SRAM), or a Flash (e.g., NAND Flash) memory device. In some embodiments, mass memory 630 may comprise a combination of such memory types. In one embodiment, the bus 624 may comprise a Peripheral Component Interconnect Express (PCIe) bus. In some embodiments, bus 624 may comprise multiple busses instead of a single bus.

Mass memory 630 illustrates another example of computer storage media for the storage of information such as computer-readable instructions, data structures, program modules, or other data. Mass memory 630 stores a basic input/output system, BIOS 640 in read-only memory (ROM) 644, for controlling the low-level operation of the computing device 600. The mass memory also stores an operating system 641 for controlling the operation of the computing device 600.

Applications 642 may include computer-executable instructions which, when executed by the computing device 600, perform any of the methods (or portions of the methods) described previously in the description of the preceding figures. In some embodiments, the software or programs implementing the method embodiments can be read from a hard disk drive (not illustrated) and temporarily stored in RAM 632 by CPU 622. CPU 622 may then read the software or data from RAM 632, process them, and store them to RAM 632 again.

The computing device 600 may optionally communicate with a base station (not shown) or directly with another computing device. Network interface 650 is sometimes known as a transceiver, transceiving device, or network interface card (NIC).

The audio interface 652 produces and receives audio signals such as the sound of a human voice. For example, the audio interface 652 may be coupled to a speaker and microphone (not shown) to enable telecommunication with others or generate an audio acknowledgment for some action. Display 654 may be a liquid crystal display (LCD), gas plasma, light-emitting diode (LED), or any other type of display used with a computing device. Display 654 may also include a touch-sensitive screen arranged to receive input from an object such as a stylus or a digit from a human hand.

Keypad 656 may comprise any input device arranged to receive input from a user. Illuminator 658 may provide a status indication or provide light.

The computing device 600 also comprises an input/output interface 660 for communicating with external devices, using communication technologies, such as USB, infrared, Bluetooth™, or the like. The haptic interface 662 provides tactile feedback to a user of the client device.

The Global Positioning System receiver 664 can determine the physical coordinates of the computing device 600 on the surface of the Earth, which typically outputs a location as latitude and longitude values. Global Positioning System receiver 664 can also employ other geo-positioning mechanisms, including, but not limited to, triangulation, assisted GPS (AGPS), E-OTD, CI, SAI, ETA, BSS, or the like, to further determine the physical location of the computing device 600 on the surface of the Earth. In one embodiment, however, the computing device 600 may communicate through other components, provide other information that may be employed to determine the physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative and do not unduly limit the covered subject matter. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, optical storage, cloud storage, magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the example embodiments as set forth in the claims that follow. The specification and drawings are accordingly to be regarded in an illustrative rather than restrictive sense.

We claim:

1. A method comprising:
    receiving raw data from a plurality of data sources, the raw data collected while operating a cellular network;
    normalizing the raw data based on a set of logical cell sites (LCSs) in the cellular network to generate per-LCS data;
    generating an example from the per-LCS data, the example associated with a given LCS in the set of LCSs;
    generating a predicted energy consumption value for the given LCS by inputting the example into a predictive model;
    determining that the predicted energy consumption value is higher than an expected energy consumption value associated with the given LCS; and
    labeling the given LCS as an outlier.

2. The method of claim 1, wherein receiving raw data comprises receiving data comprising one or more of network consumption data, network equipment data, non-network equipment data, and external data.

3. The method of claim 2, wherein
    the network consumption data comprises one or more of cellular traffic volume, number of active connections, total number of carriers, and coverage radius of a given LCS;
    the external data comprises one or more of a location, temperature, precipitation, wind, gust, heating degree days, cooling degree days, and nearest weather station of a given LCS;
    the network equipment data comprises data related to one or more of radios, antennas, and baseband units of a given LCS; and
    the non-network equipment data comprises data related to one or more of heating, ventilation, and air conditioning (HVAC) units and batteries in a given LCS.

4. The method of claim 1, wherein normalizing the raw data based on a set of LCSs in the cellular network to generate per-LCS data comprises aggregating raw data associated with finer granularity to a given LCS based on a mapping of finer grained equipment to the given LCS.

5. The method of claim 1, wherein inputting the example into a predictive model comprises inputting the example into a decision tree-based model.

6. The method of claim 1, further comprising:
    retrieving a transmission loss for the given LCS;
    adding the transmission loss to the example to generate an augmented example; and
    predicting a likelihood that the given LCS includes an identified item of network equipment by inserting the augmented example into a second predictive model.

7. The method of claim 6 wherein inserting the augmented example into a second predictive model comprises inserting the augmented example into an ensemble model, the ensemble model including a sequential combination of machine learning models selected from the group consisting of a gradient boosting model, support vector machine model, neural network model, adaptive boosting, and logistic regression model.

8. A non-transitory computer-readable storage medium for tangibly storing computer program instructions capable of being executed by a computer processor, the computer program instructions defining steps of:
    receiving raw data from a plurality of data sources, the raw data collected while operating a cellular network;
    normalizing the raw data based on a set of logical cell sites (LCSs) in the cellular network to generate per-LCS data;
    generating an example from the per-LCS data, the example associated with a given LCS in the set of LCSs;
    generating a predicted energy consumption value for the given LCS by inputting the example into a predictive model;
    determining that the predicted energy consumption value is higher than an expected energy consumption value associated with the given LCS; and
    labeling the given LCS as an outlier.

9. The non-transitory computer-readable storage medium of claim 8, wherein receiving raw data comprises receiving data comprising one or more of network consumption data, network equipment data, non-network equipment data, and external data.

10. The non-transitory computer-readable storage medium of claim 9, wherein
the network consumption data comprises one or more of cellular traffic volume, number of active connections, total number of carriers, and coverage radius of a given LCS;
the external data comprises one or more of a location, temperature, precipitation, wind, gust, heating degree days, cooling degree days, and nearest weather station of a given LCS;
the network equipment data comprises data related to one or more of radios, antennas, and baseband units of a given LCS; and
the non-network equipment data comprises data related to one or more of heating, ventilation, and air conditioning (HVAC) units and batteries in a given LCS.

11. The non-transitory computer-readable storage medium of claim 8, wherein normalizing the raw data based on a set of LCSs in the cellular network to generate per-LCS data comprises aggregating raw data associated with finer granularity to a given LCS based on a mapping of finer grained equipment to the given LCS.

12. The non-transitory computer-readable storage medium of claim 8, wherein inputting the example into a predictive model comprises inputting the example into a decision tree-based model.

13. The non-transitory computer-readable storage medium of claim 8, the steps further comprising:
retrieving a transmission loss for the given LCS;
adding the transmission loss to the example to generate an augmented example; and
predicting a likelihood that the given LCS includes an identified item of network equipment by inserting the augmented example into a second predictive model.

14. The non-transitory computer-readable storage medium of claim 13 wherein inserting the augmented example into a second predictive model comprises inserting the augmented example into an ensemble model, the ensemble model including a sequential combination of machine learning models selected from the group consisting of a gradient boosting model, support vector machine model, neural network model, adaptive boosting, and logistic regression model.

15. An apparatus comprising:
a processor configured to:
receive raw data from a plurality of data sources, the raw data collected while operating a cellular network;
normalize the raw data based on a set of logical cell sites (LCSs) in the cellular network to generate per-LCS data;
generate an example from the per-LCS data, the example associated with a given LCS in the set of LCSs;
generate a predicted energy consumption value for the given LCS by inputting the example into a predictive model;
determine that the predicted energy consumption value is higher than an expected energy consumption value associated with the given LCS; and
label the given LCS as an outlier.

16. The apparatus of claim 15, wherein receiving raw data comprises receiving data comprising one or more of network consumption data, network equipment data, non-network equipment data, and external data.

17. The apparatus of claim 15, wherein normalizing the raw data based on a set of LCSs in the cellular network to generate per-LCS data comprises aggregating raw data associated with finer granularity to a given LCS based on a mapping of finer grained equipment to the given LCS.

18. The apparatus of claim 15, wherein inputting the example into a predictive model comprises inputting the example into a decision tree-based model.

19. The apparatus of claim 15, the processor further configured to:
retrieve a transmission loss for the given LCS;
add the transmission loss to the example to generate an augmented example; and
predict a likelihood that the given LCS includes an identified item of network equipment by inserting the augmented example into a second predictive model.

20. The apparatus of claim 19 wherein inserting the augmented example into a second predictive model comprises inserting the augmented example into an ensemble model, the ensemble model including a sequential combination of machine learning models selected from the group consisting of a gradient boosting model, support vector machine model, neural network model, adaptive boosting, and logistic regression model.

* * * * *